Figure 1:
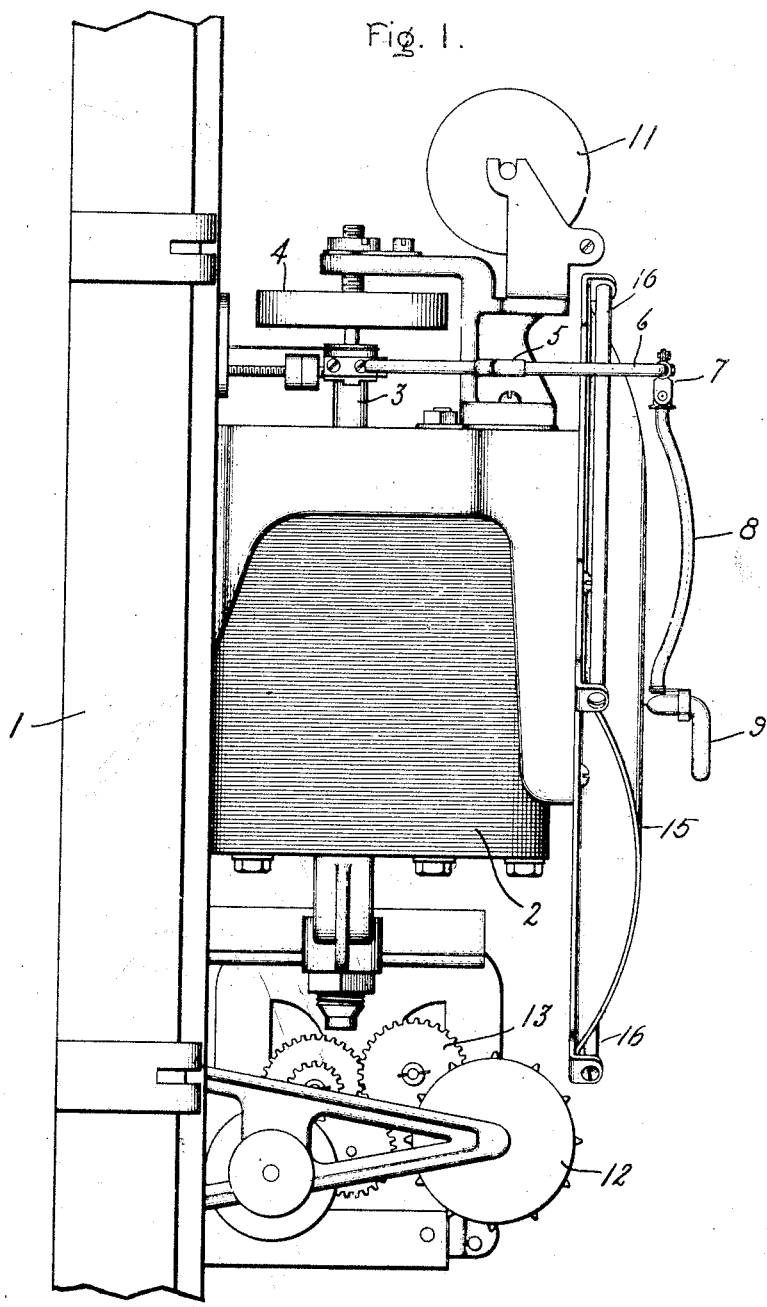

W. H. PRATT.
RECORDING DEVICE.
APPLICATION FILED JUNE 14, 1909.

974,183.

Patented Nov. 1, 1910.
3 SHEETS—SHEET 1.

Witnesses:
George W. Tilden
J. Ellis Ela

Inventor:
William H. Pratt,
by Albert G. Davis
Att'y.

W. H. PRATT.
RECORDING DEVICE.
APPLICATION FILED JUNE 14, 1909.

974,183.

Patented Nov. 1, 1910.
3 SHEETS—SHEET 2.

Witnesses:
George W. Tilden
J. Ellis Elee

Inventor:
William H. Pratt,
by Albert H. Davis
Att'y.

UNITED STATES PATENT OFFICE.

WILLIAM H. PRATT, OF LYNN, MASSACHUSETTS, ASSIGNOR TO GENERAL ELECTRIC COMPANY, A CORPORATION OF NEW YORK.

RECORDING DEVICE.

974,183.  Specification of Letters Patent.  Patented Nov. 1, 1910.

Application filed June 14, 1909. Serial No. 501,995.

*To all whom it may concern:*

Be it known that I, WILLIAM H. PRATT, a citizen of the United States, residing at Lynn, in the county of Essex and State of Massachusetts, have invented certain new and useful Improvements in Recording Devices, of which the following is a specification.

My invention relates to recording devices, particularly those used in connection with measuring instruments in which a pen or marker has an angular movement about an axis of oscillation and more especially to electrical measuring instruments in which the marker is mounted on a pivoted moving element of the instrument and swings in the arc of a circle over a moving record sheet on which a permanent record is made of the indications of the instrument.

The most common and desirable type of measuring and recording devices are those in which a movable member is shifted through different angles about an axis of oscillation in response to variations in the quantity to be measured and the record of those variations is secured by a pen or marker mounted on the moving element and arranged to make a mark upon a long record sheet or strip moved by clockwork or similar mechanism. Since the record sheet is flat and the marker moves in the arc of a circle, equal angular displacements of the marker do not produce marks of equal length on the record sheet and hence the record sheet must be specially ruled in order to produce a record which can be easily read.

In order that equal angular movements of the marker may always produce marks of equal length on the record sheet, it has been proposed to draw the record sheet over the surface of a right cylinder, the axis of which is the axis of rotation of the marker and the radius of which is the distance of the marker from its axis of oscillation, but such an arrangement is objectionable because the material of the record sheet is usually paper, which is not elastic and must be distorted in order to be drawn over the surface of the cylinder in a direction parallel to the axis of the cylinder, and there must be a comparatively long strip of record sheet between each end of the cylinder and the rollers on which the record sheet is wound in order to permit the record sheet to be sufficiently distorted to conform to the shape of the cylinder.

The object of my invention is to provide a device whereby a record sheet may be shaped to form a cylindrical surface over which a marker may swing in the arc of a circle and make marks on the record sheet of equal length for equal angular movements of the marker, in which the sheet is not distorted or strained, which permits the construction of a recording device as compact as though the record sheet were drawn over a flat surface and which is particularly adapted for electrical measuring instruments.

In carrying out my invention, the record sheet is bent into the form of a cylindrical surface formed by a straight line which moves parallel to itself along the curve described by the pen or marker of the measuring instrument, the straight line being inclined at an angle to the plane of movement of the marker. The angle formed by the straight line with the plane of movement of the marker may vary within wide limits, but is preferably somewhere near 45°, as this angle produces the most compact and satisfactory form of device. The record sheet may be curved to the desired form in various ways, but in the preferred construction is drawn over a curved sheet or platen which forms a cylindrical surface extending obliquely across the path of movement of the record sheet and through the plane of movement of the marker at an angle and which intersects the plane of movement of the marker to form a curve or arc of a circle in which the marker moves as it oscillates back and forth about its axis of oscillation. The record sheet is held in contact with the curved surface or platen in any suitable way, so that the sheet is compelled to assume the same form as the platen, and owing to the manner in which the cylindrical surface is generated and its relation to the marker, equal angular movements of the marker about its axis will produce marks of equal length on the record sheet, so that a rectangular sheet having rectangular coördinates can be used, whereby a very desirable and legible record is secured.

My invention will best be understood in connection with the accompanying drawings, which for the purpose of illustration show one of the many forms in which the invention may be embodied, the particular form shown being used with an electric measuring instrument and in which—

Figure 2:
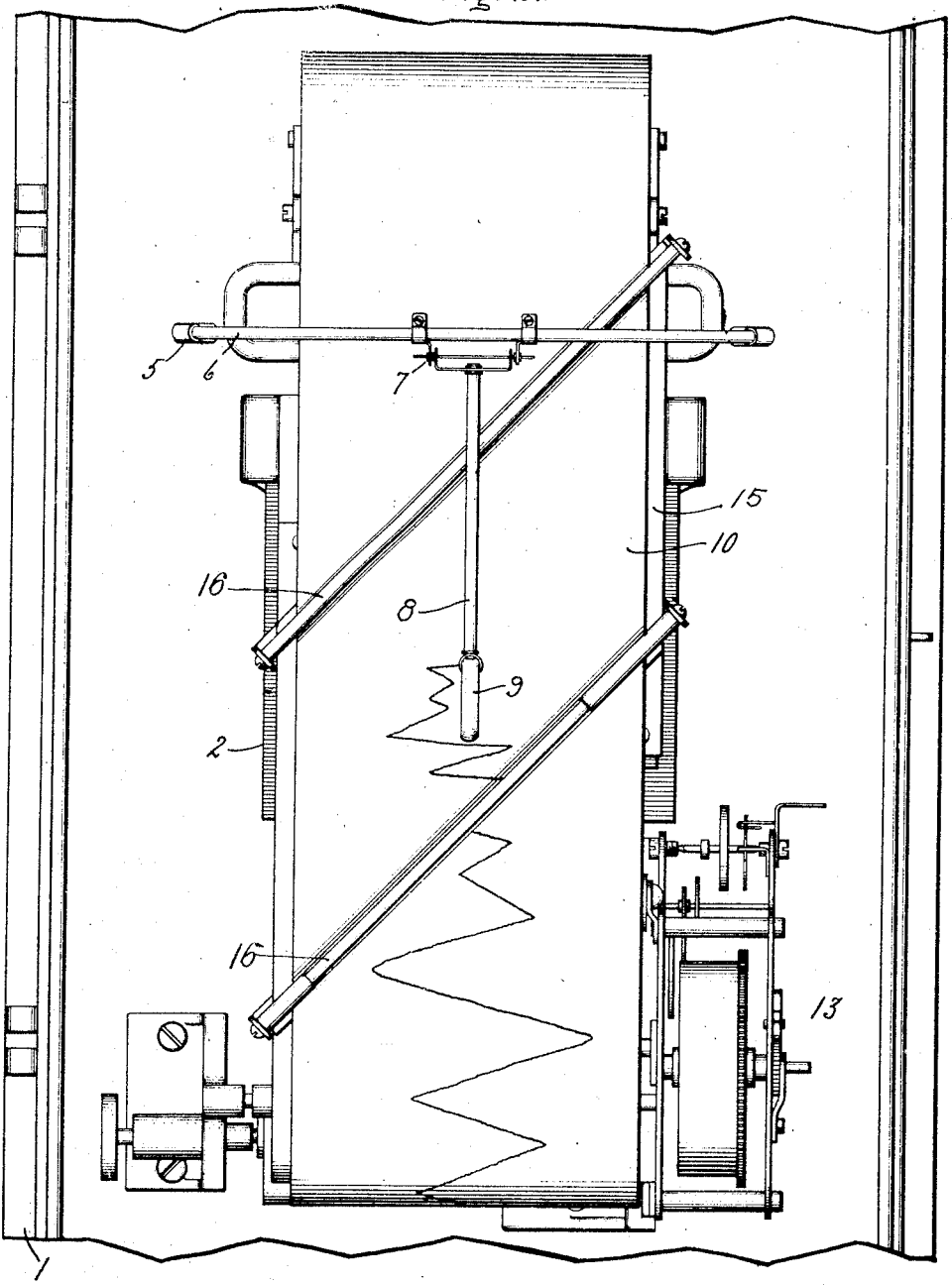
Figure 3:
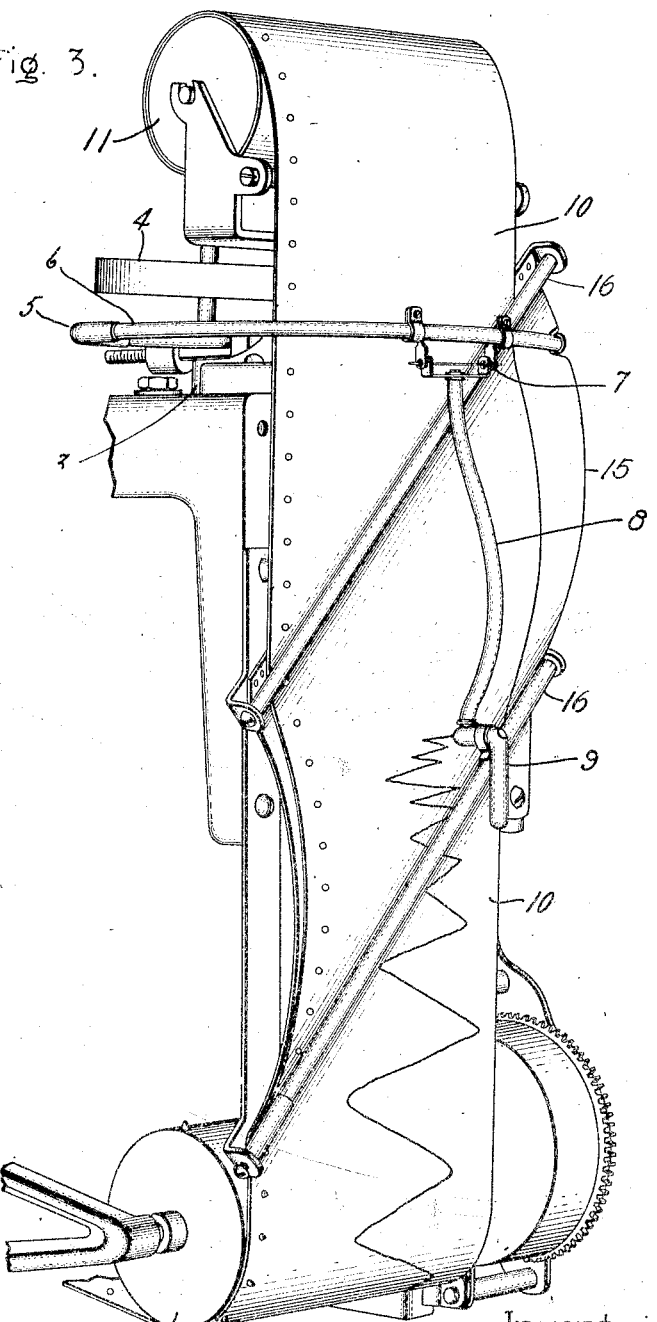

Figure 1 is a side elevation of a recording electrical measuring instrument embodying my invention; Fig. 2 is a plan view of the instrument shown in Fig. 1; and Fig. 3 a view in perspective of the mechanism by means of which the record sheet is bent to the desired form.

While any type of measuring device may be used which has a pivoted moving element, I have shown in the drawings a form of electric measuring instrument mounted on a vertical base or panel 1 and comprising a field magnet 2 in which the moving coil or other movable element of the instrument is mounted on a shaft 3 carried in suitable bearings and normally held in the zero position by a control spring 4. The type of instrument is such that equal changes in the quantity to be measured will cause equal angular movements of the moving element about the shaft 3 as a center, so that if the instrument is a voltmeter, for example, a voltage of 50 causes an angular deflection of a certain amount and a voltage of 100 causes an angular deflection of twice that amount.

In order to make a permanent record of the angular deflections of the moving element of the instrument, arms 5 are rigidly secured to the shaft 3 and diverge in the manner shown, the outer ends of these arms being connected by an arc shaped member 6, the whole forming a sort of yoke mounted upon and movable with the shaft 3. The arc shaped member carries near the middle a horizontal pivot 7 on which a swinging arm 8 is loosely mounted in such a manner that it can swing freely about the pivot 7 toward and away from the shaft 3, but has the same angular movement as the shaft. On the lower end of the swinging arm 8 a pen or marker 9 is mounted for the purpose of engaging the record sheet and making on the sheet a permanent record of the angular movements of the shaft 3 of the measuring instrument.

The preferred form of record sheet is that commonly used in recording devices and is in the form of a long strip or ribbon wide enough to record the greatest angular movements of the shaft 3 of the instrument and preferably of great length, so that it need be renewed only at infrequent intervals. As is customary in recording devices, the record sheet 10 is wound in the form of a roll and the fresh record sheet is mounted on the upper end of the instrument on a supply roller 11 and is gradually moved downward in a direction parallel to the shaft 3 or axis of oscillation of the marker by means of a feed roller 12 driven at a uniform rate by any suitable clock mechanism 13.

In the form of measuring device shown in the drawing, the pen or marker 9 swings in the arc of a circle about the shaft 3 as a center and the length of the arc described by it depends upon the angular movement of the shaft 3. In order that the equal angular movements of the pen or marker 9 may produce marks of equal length, that portion of the record sheet between the supply roller 11 and the feed roller 12 is bent to form a cylindrical surface of such a shape that the pen or marker 9 remains in contact with the surface at every point of its path and makes marks of equal length on the surface for equal angular deflections of the shaft 3.

In the preferred form of construction, which is shown in the drawings, the record sheet is bent to the proper form by being drawn over a bent plate or platen 15, having a cylindrical surface generated by a straight line moving parallel to itself along the arc of the circle described by the pen or marker 9 and always remaining parallel to a straight line which intersects the plane of movement of the pen at an angle to said plane and which may be called the axis of the cylindrical surface. By the term cylindrical surface or platen I mean a surface generated in the manner above described, although this surface is not truly circular and is not a portion of the surface of a right cylinder, but may vary within considerable limits without materially affecting the accuracy of the record. It is not necessary that the straight line by which the surface is generated should follow exactly the same curve as that described by the pen or marker 9, since only a slight error is introduced if the generating straight line follows a curve which approximates the curve described by the pen or marker. The platen 15 is a portion of a cylinder of which a right section is an ellipse, and may, therefore, be said to be a portion of the surface of a cylindroid, as is evident from the drawings.

In practice the platen over which the paper is fed may be previously shaped on a cylinder of which a right section is an ellipse, and the curved surface thus produced is inclined relatively to the line of movement of the paper, in that a transverse section through the platen cut in the plane of pen movement is a circle. The axis of the curved or cylindrical platen or surface 15 intersects the horizontal plane of movement of the pen or marker 9 at an angle which may vary within wide limits, but which is preferably about 45°, as shown in the drawings, and hence the platen extends across the path of the record sheet at an angle of about 45°. In other words, in the particular type of instrument shown in the drawings, the axis of oscillation of the pen or marker is vertical and the pen moves in a horizontal plane through which that cylinder, of which the platen 15 is a portion, extends at an angle of about 45°. When the platen 15 is accurately shaped or curved, the line of intersection of the platen with the horizontal plane of movement of the pen will be an arc of the circle in which the pen or marker moves. When that portion of the platen 15 which is engaged by the marker 9 as the marker swings back and forms the arc of a circle concentric with the shaft 3, equal angular movements of the marker will produce marks of equal length on the surface of the platen and if the record sheet 10 is made to conform to the shape of the platen the record secured will be a record with rectangular coördinates in which marks of equal length will be produced by equal angular movement of the marker on the surface of the platen.

The record sheet may be conformed to the shape of the platen 15 by any suitable manner, preferably by means of holding rods 16 which, as shown in the drawings, extend along each edge of the platen across the record sheet which extends underneath the holding rods and over the surface of the platen and is drawn taut so that that portion of the record sheet between the holding ribs is of the same curvature as the platen 15. Since the record sheet is drawn obliquely across the platen at an angle to the long axis of the surface of the platen, the sheet passes under the holding rod 16, over the curved surface of the platen, and out beneath the lower holding rod 16 without being subjected to any distortion or strain, and consequently the holding roller 11 and feed roller 12 may be placed as close to the measuring instrument as though the record sheet were carried over a flat surface. As a result of this construction, a recording instrument embodying my invention is of the least possible dimensions and is fully as compact as any of the recording instruments and devices heretofore used in the art.

My invention may be embodied in many other forms than that shown and described and I do not therefore wish to restrict my invention to the precise arrangement disclosed, but aim in the appended claims to cover all modifications which are within the spirit and scope of my invention.

What I claim as new and desire to secure by Letters Patent of the United States, is:

1. In a recording device, the combination with a marker mounted to swing about an axis of oscillation, of means for moving a record sheet in a direction parallel to said axis of oscillation and over a cylindrical surface curved about an axis which forms an angle with said axis of oscillation.

2. In a recording device, the combination with a marker mounted to swing about an axis of oscillation, of means for moving a record sheet in a direction parallel to said axis of oscillation and over a curved surface which is coincident with the path of the marker and extends obliquely across both the path of the record sheet and the path of said marker.

3. In a recording device, the combination with a marker mounted to swing about an axis of oscillation, of means for moving a record sheet in a direction parallel to said axis of oscillation and over a curved surface which extends obliquely across the path of the record sheet and through the plane of movement of said marker, whereby equal angular movements of said marker produce marks of equal length on the record sheet.

4. In a recording device, the combination with a marker mounted to swing about an axis of oscillation, of means for moving a record sheet in a direction parallel to said axis of oscillation and a curved platen mounted to extend obliquely across the path of the record sheet and through the plane of movement of said marker, the intersection of said platen with said plane being substantially an arc about said axis of oscillation as a center.

5. In a recording device, the combination with a marker mounted to swing about an axis of oscillation, of means for moving a record sheet in a direction parallel to said axis, and a platen for said record sheet intersected by the plane of movement of said marker and inclined to said plane, said platen being curved to render its intersection with said plane substantially an arc about said axis of oscillation as a center.

6. In a recording device, the combination with a marker mounted to swing about a vertical axis of oscillation, of means for moving a record sheet vertically, and a platen for supporting said record sheet, said platen being mounted at an angle to the vertical and curved to have a substantially circular cross-section in a horizontal plane.

7. In a recording device, the combination with a marker mounted to swing about an axis of oscillation, of a platen mounted to coöperate with said marker and bent to conform to the surface of a cylindroid which is mounted with its longitudinal axis at an angle to the plane of movement of said marker, and means for moving the record sheet parallel to said axis of oscillation and over said platen.

8. In a recording device, the combination with a marker mounted to swing about an axis of oscillation, of means for moving a record sheet in a direction parallel to said axis of oscillation, a convex platen mounted to extend obliquely across the path of the record sheet, and means for holding the record sheet in contact with said platen.

9. In a recording device, the combination with a marker mounted to swing about an axis of oscillation, of a platen bent to approximate the surface of a cylinder which extends through and is inclined to the plane of movement of said marker, means for moving the record sheet over said platen in a direction parallel to said axis of oscillation, and rods mounted parallel to the axis of said cylinder to extend across the record sheet and hold it in contact with said platen.

10. In a recording device, the combination with a marker mounted to swing about an axis of oscillation, of a cylindrical platen intersected at its center by a line perpendicular to said axis and angularly displaced relatively to said axis about said line as a center, means for moving a record sheet over said platen in a direction parallel to said axis of oscillation, and rods mounted at opposite edges of said platen to extend across the path of the record sheet and thereby cause the record sheet to conform to the shape of said platen.

In witness whereof, I have hereunto set my hand this tenth day of June 1909.

WILLIAM H. PRATT.

Witnesses:
JOHN A. McMANUS, Jr.,
HENRY O. WESTENDARP.